(12) United States Patent
Pryor

(10) Patent No.: US 6,492,274 B1
(45) Date of Patent: Dec. 10, 2002

(54) SLURRIES OF ABRASIVE INORGANIC OXIDE PARTICLES AND METHOD FOR ADJUSTING THE ABRASIVENESS OF THE PARTICLES

(75) Inventor: James Neil Pryor, West Friendship, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 11 days.

(21) Appl. No.: 09/703,404

(22) Filed: Nov. 1, 2000

Related U.S. Application Data

(62) Division of application No. 09/422,384, filed on Oct. 21, 1999, now Pat. No. 6,294,106.
(60) Provisional application No. 60/105,141, filed on Oct. 21, 1998.

(51) Int. Cl.[7] ............................................. H01L 21/302
(52) U.S. Cl. ....................................... 438/692; 438/693
(58) Field of Search ................................. 438/689, 690, 438/691, 692, 693; 252/79.1–79.5

(56) References Cited

U.S. PATENT DOCUMENTS

| | | | |
|---|---|---|---|
| 3,527,028 A | 9/1970 | Oswald | 51/281 |
| 4,226,743 A | 10/1980 | Seese et al. | 252/453 |
| 4,304,575 A | 12/1981 | Payne | 51/308 |
| 4,356,107 A | 10/1982 | Payne | 252/313 |
| 4,463,108 A | 7/1984 | Wagner et al. | 523/216 |
| 5,342,876 A | 8/1994 | Abe et al. | 524/493 |
| 5,527,423 A | 6/1996 | Neville et al. | 156/636.1 |
| 5,543,126 A | 8/1996 | Ota et al. | 423/263 |
| 5,700,838 A | 12/1997 | Dickens et al. | 514/575 |
| 5,769,689 A | 6/1998 | Cossaboon et al. | 451/41 |
| 5,769,691 A * | 6/1998 | Fruitman | 451/287 |
| 5,800,577 A | 9/1998 | Kido | 51/307 |
| 5,951,724 A * | 9/1999 | Hanawa et al. | 438/693 |
| 6,027,669 A * | 2/2000 | Miura et al. | 106/286.7 |

FOREIGN PATENT DOCUMENTS

| | | | |
|---|---|---|---|
| EP | 0773270 | 5/1997 | C09G/1/02 |
| EP | 0846742 | 6/1998 | C09G/1/02 |
| WO | WO 99/61244 | 12/1999 | B32B/19/00 |
| WO | WO 00/13218 | 3/2000 | H01L/21/306 |

* cited by examiner

Primary Examiner—Benjamin L. Utech
Assistant Examiner—Kin-Chan Chen
(74) Attorney, Agent, or Firm—Charles A. Cross

(57) ABSTRACT

Autoclaving slurries of porous, inorganic oxide particles results in an increased abrasiveness of the particles as reflected in increased removal rates of a polished substrate at standard polishing conditions in chemical mechanical polishing operations. Slurries having novel abrasion properties, especially for silica-based slurries, are created. The increase in particle abrasivity strongly correlates with a decrease in particle surface area as determined by $N_2$ adsorption (BET method). As a result, methods for obtaining a desired abrasivity for a slurry can be practiced by heating a slurry of inorganic oxide particles to a BET surface area previously identified as associated with the abrasivity desired. The resulting slurries can be used in conventional polishing machinery. The method is particularly suitable for preparing silica-based abrasive slurries.

9 Claims, 2 Drawing Sheets

SLURRIES OF ABRASIVE INORGANIC OXIDE PARTICLES AND METHOD FOR ADJUSTING THE ABRASIVENESS OF THE PARTICLES

RELATED APPLICATION

This is a division of application Ser. No. 09/422,384, filed Oct. 21, 1999, now U.S. Pat. No. 6,294,106 B1.

This application is a continuation-in-part of provisional application 60/105,141, filed Oct. 21, 1998, the contents of which are incorporated by reference.

BACKGROUND OF THE INVENTION

The field of this invention relates to slurries of abrasive inorganic oxide particles and methods for altering and controlling the abrasiveness of the particles for use in cleaning and polishing applications. In particular, it relates to altering or controlling the abrasivity of inorganic oxide particles used in chemical/mechanical polishing (CMP) processes carried out to planarize electronic chips.

The function of an abrasive slurry in chemical/mechanical polishing electronic chips is to polish or planarize either an insulating or conducting layer deposited on the chip to a highly planar state. This planarization maximizes sharpness of focus in subsequent photo-lithography steps used to deposit additional insulating and conductive layers. The slurry also must provide uniform polishing across the wafer without undue scratching or pitting of the polished substrate. While meeting these requirements it is also desirable to maximize polish rate in order to maximize the productivity of high-cost polishing equipment.

It therefore would be desirable to improve present slurries and their methods of manufacture so that one can easily modify the slurry to produce particles having a range of abrasivities. Having such a method would allow one to optimize the polishing process to yield the highest polish rate without undue scratching, non-uniformity of polishing or loss of process control. Such a method would be especially useful in developing new abrasive slurries for insulating and conducting materials being considered for use in chip manufacturing in the near future.

In general, conventional slurries comprise abrasive particles and/or soluble chemical ingredients. The particles and additional ingredients alter the abrasive and/or polishing effects imparted by the slurry. The particles and ingredients are selected to meet the polishing requirements for the insulating or conducting layer being polished.

U.S. Pat. No. 5,527,423 to Neville, et al. is an example of such slurries. It discloses CMP slurries comprising fumed silicas or fumed alumina particles dispersed in a stable aqueous medium. Neville also mentions that precipitated alumina can be used. Neville et al. disclose that the particles have a surface area ranging from about 40 m$^2$/g to about 430 m$^2$/g, an aggregate size distribution less than about 1.0 micron and a mean aggregate diameter less than about 0.4 micron. This patent also discusses references that teach the addition of etchants, such as hydrogen peroxide, or alkaline materials to CMP slurries. Other patents that disclose CMP slurries containing hydrogen peroxide and/or other acidic or alkaline additives include U.S. Pat. Nos. 5,700,838 to Feller, et al., 5,769,689 to Cossaboon, et al., 5,800,577 to Kidd and 3,527,028 to Oswald. In general, slurries such as these are based on the concept of selecting an inorganic oxide particle and either relying on the particles' inherent abrasive properties for polishing or by adding additional chemistry to the slurry in order to adjust the abrasive and/or polishing effects imparted by the slurry.

U.S. Pat. No. 4,304,575 to Payne discloses the preparation of aqueous silica sols for use as abrasive materials in mechanically polishing semiconductor wafers. Payne's method for preparing the sol comprises heating an initial alkaline aqueous silica sol containing a mixture of relatively smaller particles and relatively larger particles. It is stated by Payne that the smaller particles dissolve and redeposit on larger particles thereby producing an aqueous silica sol in which the majority of the silica particles have a size significantly larger than the larger silica particles in the starting mixed sol. Payne's materials are prepared from sols having average particle size less than 100 millimicrons and preferably having final particle size of about 180 millimicrons. A similar disclosure is set forth in U.S. Pat. No. 4,356,107 also to Payne.

It is still desirable to devise methods of making abrasive slurries in such a way that the abrasiveness of the particles can be easily adjusted to meet the polishing requirements at hand without having to resort to additional chemistry or a new starting material for the abrasive particle.

SUMMARY OF THE INVENTION

In this invention, aqueous slurries of fine, porous, inorganic oxide particles are heated, e.g., in an autoclave, to increase the particles' abrasivity. These slurries are preferably prepared directly from slurries having a median particle size in the range of 0.1 to about 0.5 micron and wherein substantially all of the particle size distribution is below one micron. Slurries produced by this process have abrasive properties such that an alkaline slurry (e.g., at pH 10.8) consisting of water and the inorganic oxide particles removes silica at a rate of at least 120 mm/ minute at 200 psi·rpm. This measurement was made at a solids content of 12.6% by weight, at a pH of about 10.8 and with a Strasbaugh 6CA polisher with a SUBA 500 pad at a two minute polish time.

As mentioned above, autoclaving slurries of fine particle, porous, amorphous silica imparts an increased abrasiveness to the particles. This is reflected in increased removal rates of silica substrate at standard polishing conditions. This increase in particle abrasivity strongly correlates with a decrease in particle surface area as determined by $N_2$ adsorption (BET method). It is thought that this increase in particle abrasiveness and associated decrease in particle surface area is attributable to silica transport during the autoclaving process whereby silica is preferentially dissolved from sharply convex surfaces within the porous particle and redeposited at sharply concave surfaces at the junction of silica subunits (ultimate particles) that make up the porous particle. This redeposition should thus strengthen the porous silica particle and increase its abrasivity. The elevated temperatures associated with autoclaving serve to accelerate this dissolution-redeposition process by increasing silica solubility. A similar process takes place in alkaline aqueous suspensions of silica particles held at room temperature or temperatures up to ambient pressure boiling (~100° C. ), but much longer times would be required.

Accordingly, a method for imparting a desired abrasivity for a slurry of particles can be devised by thermally treating the slurries to predetermined surface areas which have been identified with a particular polishing rate. The method comprises (a) preparing a slurry of porous inorganic oxide particles having measurable BET surface area, (b) heating the slurry to obtain a particle BET surface area previously identified to have the desired abrasivity as measured by a polishing rate, and (c) adjusting the slurry to be suitable for use as an abrasive slurry.

This invention is especially suitable for preparing slurries of silica gel particles. Fumed and precipitated silica slurries also can be similarly processed to undergo an increase in abrasivity. Even further, porous particles of $Al_2O_3$ and other slightly soluble inorganic oxide materials can undergo an increase in abrasivity using these methods.

DETAILED DESCRIPTION

Figure 1:
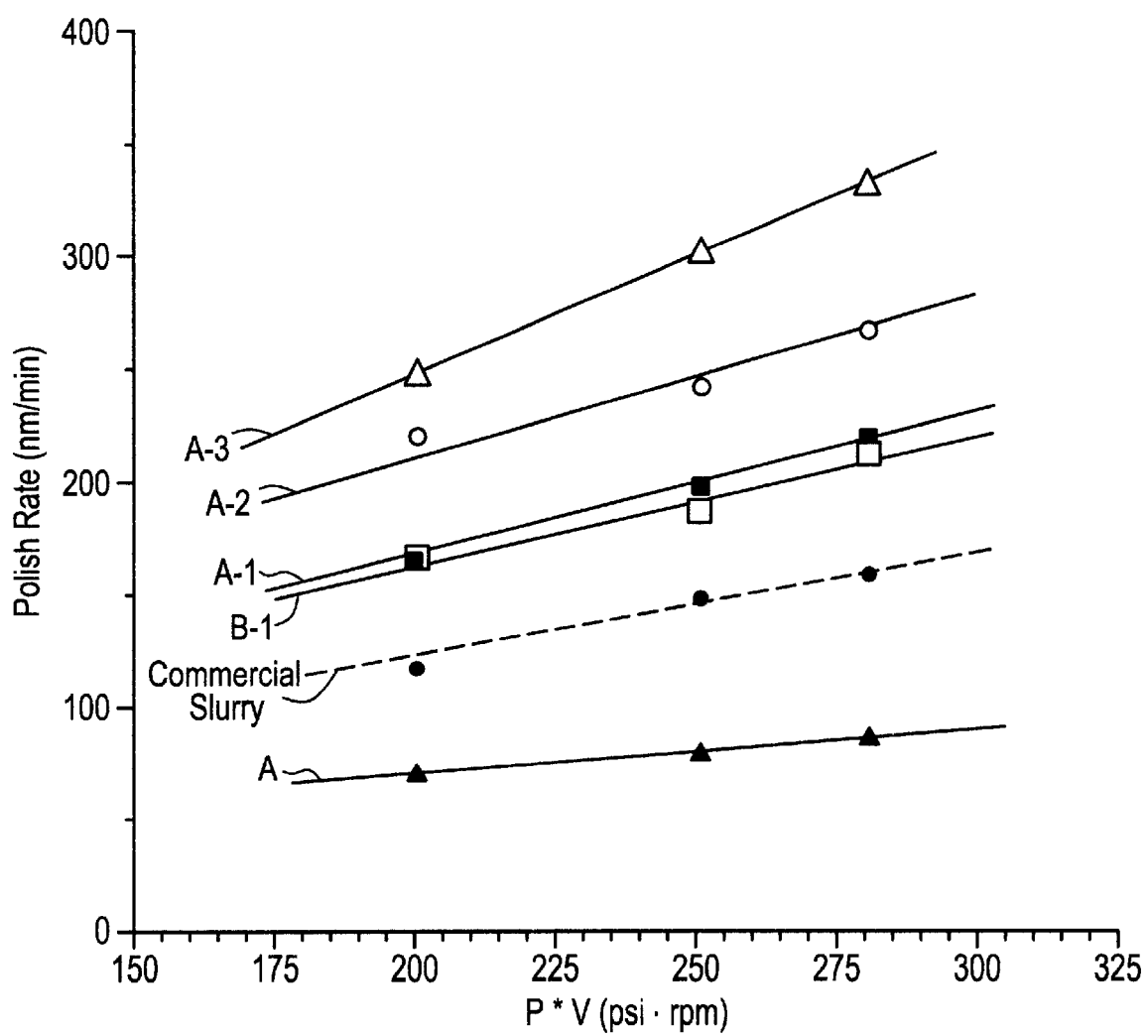
FIG. 1 is a graph which illustrates that increasing the severity of heating conditions according to this invention decreases the surface area of the slurried particles as well as increases the abrasiveness of those particles. Results for A1 through A3 are those for slurries prepared according to the invention. The polishing rates from those slurries are compared to the polishing rates from a prior art chemical mechanical polishing slurry containing fumed silica (Rodel ILD 1300) having a BET surface area of 105 $m^2/g$. The polishing rates reported are illustrated by the rate at which silica dielectric material is removed at rates in nanometers per minute at various pressures (psi) and angular velocity rates (rpm) imparted by the polishing equipment. The pressure (P) referred is the pressure between the polishing pad and the wafer. The velocity (V) referenced is the angular velocity at which the polishing pad is rotated during polishing.

The initial steps in preparing the slurries of this invention comprise forming a slurry of inorganic oxide particles and then milling and separating particles from the slurry under conditions and in a manner sufficient to create a dispersion comprising particles having a particle size distribution suitable for chemical mechanical polishing, e.g., polishing silica dielectric layers. Typically, the final slurry has a particle size distribution which is essentially less than one micron.

(1) Parent Inorganic Oxide Particles

Inorganic oxides suitable for preparing the slurry include precipitated inorganic oxides and inorganic oxide gels. It is preferable that the inorganic oxide is soluble. Slightly soluble inorganic oxides can be used as well if the heating steps described later below are appropriately adjusted to alter the abrasivity of the selected inorganic oxide at the pH conditions needed to solubilize that inorganic oxide.

The initial inorganic oxide slurries are referred to herein as "parent inorganic oxides," "parent particles" or "parent dispersions". Amorphous silica gels are particularly suitable parent inorganic oxides. The dispersion can also be prepared from mixed inorganic oxides including $SiO_2·Al_2O_3$, $MgO·SiO_2·Al_2O_3$. Mixed inorganic oxides are prepared by conventional blending or cogelling procedures.

In embodiments comprising gels, the dispersions are derived from porous inorganic oxide gels such as, but not limited to, gels comprising $SiO_2$, $Al_2O_3$, $AlPO_4$, $MgO$, $TiO_2$, and $ZrO_2$. The gels can be hydrogels, aerogels, or xerogels. A hydrogel is also known as an aquagel which is formed in water and as a result its pores are filled with water. A xerogel is a hydrogel with the water removed. An aerogel is a type of xerogel from which the liquid has been removed in such a way as to minimize any collapse or change in the gel's structure as the water is removed. Silica gels commercially available as Syloid® grade gels, e.g., grades 74, 221, 234, 244, W300, and Genesis™ silica gels are suitable parent inorganic oxides.

Methods of preparing inorganic oxide gels are well known in the art. For example, a silica gel is prepared by mixing an aqueous solution of an alkali metal silicate (e.g., sodium silicate) with a strong acid such as nitric or sulfuric acid, the mixing being done under suitable conditions of agitation to form a clear silica sol which sets into a hydrogel, i.e., macrogel, in less than about one-half hour. The resulting gel is then washed. The concentration of inorganic oxide, i.e., $SiO_2$, formed in the hydrogel is usually in the range of about 10 and about 50, preferably between about 20 and about 35, and most preferably between about 30 and about 35 weight percent, with the pH of that gel being from about 1 to about 9, preferably 1 to about 4. A wide range of mixing temperatures can be employed, this range being typically from about 20 to about 50° C.

The newly formed hydrogels are washed simply by immersion in a continuously moving stream of water which leaches out the undesirable salts, leaving about 99.5 weight percent or more pure inorganic oxide behind.

The porosity of preferred parent silica gels can vary and is affected by the pH, temperature, and duration of the water used to wash the gel. Silica gel washed at 65–90° C. at pH's of 8–9 for 15–36 hours will usually have surface areas (SA) of 250–400 and form aerogels with pore volumes (PV) of 1.4 to 1.7 cc/gm. Silica gel washed at pH's of 3–5 at 50–65° C. for 15–25 hours will have SA's of 700–850 and form aerogels with PV's of 0.6–1.3. These measurements are generated by $N_2$ porosity analysis.

Methods for preparing other inorganic oxide gels such as alumina and mixed inorganic oxide gels such as silica/alumina cogels are also well known in the art. Methods for preparing such gels are disclosed in U.S. Pat. No. 4,226,743, the contents of which are incorporated by reference.

Fumed inorganic oxides such as silicas and aluminas can also be chosen as the parent inorganic oxide. The production of fumed silicas and aluminas is a well-documented process and involves the hydrolysis of suitable feedstock vapor, such as silicon tetrachloride or aluminum chloride, in a flame of hydrogen and oxygen.

Once an inorganic oxide is selected for the parent dispersion, an dispersing medium for the slurry of the selected inorganic oxide is chosen. The slurry can be prepared using residual water in inorganic oxide gels which have been drained, but not yet dried, and to which additional water is added. In another embodiment, dried inorganic oxides, e.g., xerogels, are dispersed in water. In general, the parent dispersion should be in a state that can be wet milled. The size of the parent particles only needs to be sufficient such that the mill being used can produce a dispersion having the desired particle size distribution. In most embodiments, the parent dispersion has a median particle size approximately in the range of 10 to 40 microns. In embodiments prepared from a drained inorganic oxide gel, the drained gel may first be broken up into gel chunks and premilled to produce a dispersion of particles in the range of 10 to 40 microns.

(2) Milling and Centrifuging

The parent dispersion is then milled. The milling is conducted "wet", i.e., in liquid media chosen as the dispersing medium. The general milling conditions can vary depending on the feed material, residence time, impeller speeds, and milling media particle size. Suitable conditions and residence times are described in the Examples. These conditions can be varied to obtain the particular particle size distribution, typically below one micron. The techniques for selecting and modifying these conditions are known to those skilled in the art.

The milling equipment used to mill the parent inorganic oxide particles should be of the type capable of severely milling materials through mechanical action. Such mills are commercially available, with hammer and sand mills being particularly suitable for this purpose. Hammer mills impart the necessary mechanical action through high speed metal blades, and sand mills impart the action through rapidly churning media such as zirconia or sand beads. Impact mills can also be used. Both impact mills and hammer mills reduce particle size by impact of the inorganic oxide with metal blades.

The milled slurry is then centrifuged to separate the dispersion into a supernatant phase, which comprises the particles of the final product, and a settled phase, which comprises larger particles which we usually remove to prepare the final abrasive slurry. The supernatant phase is removed from the settled phase, e.g., by decanting, with the supernatant being further processed according to the invention. Conventional centrifuges can be used for this phase separation. A commercially available centrifuge suitable for this invention is identified in the Examples below. In some instances, it may be preferable to centrifuge the supernatant two, three or more times to further remove large particles remaining after the initial centrifuge.

The particles of the slurry recovered from the milling and centrifuging are porous. Silica gel slurries recovered from these steps typically have pore volumes similar to that of the parent inorganic oxide. The porosity of particles recovered from milling and centrifuging of other parent inorganic oxides depends on the inorganic oxide and how it is made. For example, slurries prepared from parent precipitated and fumed inorganic oxides have pore volumes less than that of the parent inorganic oxide.

(3) Heating the Slurry

The centrifuged slurry then is thermally treated under conditions sufficient to alter and adjust the distribution of inorganic oxide within the pore structure of the particles, thereby altering the hardness or abrasiveness of the particles. As indicated earlier, it is believed that in heating conditions such as those in an autoclave, inorganic oxide, e.g., silica, preferentially dissolves from sharply convex surfaces, i.e., those found around the edges (rims) of pores, and redeposits at sharply concave surfaces, such as those at the juncture of ultimate particles which form the pores of the inorganic oxide particles. It is believed that repositioning inorganic oxide to these junctures strengthens the particle structure and as a result creates a harder and more abrasive particle.

Treating the centrifuged slurry in an autoclave is one method of thermal treatment that can be used to make the inventive slurry. By "autoclave" it is meant a pressure reactor which allows for heating of the slurry above the ambient pressure boiling point of the slurry's solution phase. For aqueous slurries, this temperature is about 100° C. The pH of the slurry is adjusted before it is placed in the autoclave and depends on the inorganic oxide selected for the slurry. The pH is adjusted so as to optimize the solubility of the inorganic oxide, thereby decreasing the residence time in the autoclave. However, the pH should not be such that the amount of inorganic oxide solubilized results in unwanted agglomeration and precipitation of secondary inorganic oxide particles when the slurry is cooled to ambient temperature. For example, slurries of silica can be adjusted to a pH of 8–10 prior to thermal treatment and depends on the substrate which will be planarized by the final slurry.

The autoclave conditions used depend on the desired hardness and the type of inorganic oxide selected for the slurry. It has been found that the more severe the autoclave conditions used, e.g., higher temperature and/or longer residence time in the autoclave, the harder the particles become, thereby increasing the abrasiveness of the particles. For water based slurries, the temperature employed for the autoclave should at least be 100° C. When preparing silica-based abrasive slurries for polishing dielectric silicon layers, the slurry can be heated at 120–180° C. for 20–30 hours. In general, silica embodiments become unstable at temperatures higher than 200° C. and should be avoided if surfactants cannot be added to the desired abrasive slurry to reduce the instability. Likewise, heating the inorganic oxide to temperatures below 100° C. require longer heating times to affect redeposition of the inorganic oxide.

As indicated earlier, the abrasiveness of the particles increases and the BET surface area measured for the particles is reduced as heating severity increases. As mentioned earlier, it is believed that the surface area reduction is caused when inorganic oxide dissolves and repositions to the junctures between ultimate particles. The data in the Examples below show that pore volume and surface area are reduced after autoclaving, and it is believed that the repositioning occurs at the expense of pore volume and the surface area associated with the pores lost. Particles having BET surface areas less than 120 $m^2/g$ and preferably less than 60 $m^2/g$ can be prepared according to this invention. The pore volume of these particles is typically in the range of 0.2 to 0.6 cc/g, as measured by nitrogen porosimetry at 0.967 P/Po.

Accordingly, a method for imparting a desired abrasivity for a selected inorganic oxide slurry can be carried out by first identifying an abrasivity or abrasivities as determined by a polishing rate(s) of a substrate, e.g., a silica substrate. BET surface area for those particles are also determined. Then once an abrasivity or polishing rate has been selected for a substrate to be worked upon one can reproduce a suitable slurry by preparing a slurry of porous inorganic oxide particles having a measurable BET surface area and then heating the slurry to obtain the particle BET surface area which was identified and associated with the desired abrasivity. As indicated, the surface area referred to herein is that measured using conventional $N_2$ BET surface area techniques. To measure the surface area (and pore volume) for these slurries, the pH is adjusted to minimize surface area reduction that can occur during drying. The slurries also have to be dried to make these measurements and are dried using conventional techniques, e.g., heating the slurries to about 90 to about 130° C. for periods long enough to dry the slurry to a powder.

The examples below show that the abrasivity of silica slurries, as measured by silicon dielectric removal rates, can be varied widely. The examples below show that silica removal rates of at least 150, at least 200 and at least 250 mm per minute can be obtained. This method is an advantage when a manufacturer is faced with polishing a variety of materials and each of the materials require a different abrasive material and/or polishing rate. With Applicant's invention, the slurries used to polish these materials can be prepared from one material, e.g., silica, without having to add other essential abrasives. Accordingly, once the slurry has been adjusted to a suitable pH, the slurry of the invention can consist essentially of dispersing medium and the inorganic oxide particles of the invention.

(4) The Final Abrasive Slurry

As indicated earlier, substantially all of the particle size distribution for the final abrasive slurry should be less than one micron. The data below indicates that the particle size distribution of the slurry after heating is substantially the same as the distribution of the slurry after milling. Preferred embodiments have a median particle size less than 0.5 microns and in the range of 0.1 to about 0.3 microns. The particle size distribution is measured using conventional light scattering instrumentation and methods. The sizes reported in the Examples were determined by a LA900 laser scattering particle size analyzer from Horiba Instruments, Inc.

The solids content of the dispersion varies and depends on the solids content of the feed particle dispersion. The solids content of the dispersion is generally in the range of 1–30% by weight and all other ranges encompassed therein. A solids content in the range of 10 to 20% by weight is particularly suitable when using silica gel for polishing dielectric layers.

In general, the dispersion's viscosity should be such that the dispersion easily flows between the wafer to be polished and the polishing pad used to polish the wafer. The pH of the slurry is dependent upon the inorganic oxide selected and the substrate to be planarized by the slurry. Silica slurries of this invention are particularly suitable for polishing silica substrates such as silica dielectric layers. Silica dielectric layers prepared from tetraethyoxysilane are illustrative. Slurries used to polish such layers are adjusted to a pH in the range of 10–11. Alumina slurries are typically used to polish metal conductive layers such as tungsten or copper. Those slurries are adjusted to a pH in the range of 4–6. The pH can be adjusted using standard pH modifiers.

The slurries of the invention can also be modified to include additional chemistry such as hydrogen peroxide as an oxidant for polishing copper. The slurries of this invention can be used with conventional polishing equipment and pads.

The examples below illustrate the performance of this invention using a Strasbaugh 6CA polisher unit using a SUBA 500 pad. These examples, however, are merely illustrative of certain embodiments of the invention and are not intended to any way limit the scope of this invention as recited in the claims appended hereto.

ILLUSTRATIVE EXAMPLES

Example 1

Preparation of Base Silica Gel Slurry

Approximately 30 gallons of an aqueous suspension of an intermediate density (ID) hydrous gel were prepared. The term "ID gel" is used to refer to hydrogel which is washed in a pH range of 5–10 after it has been initially formed and as a result has a density which is slightly less than gels prepared from hydrogels which are washed under more acidic conditions. These latter gels are referred to as regular density (RD) gels.

A slurry was prepared by dispersing the ID hydrogel, milling it in an ACM mill and partially drying the hydrogel to prepare a hydrous silica gel having a 55% by weight total volatiles content.

The hydrous gel slurry was then milled further in a NETZSCH media mill (12 liters, 1.2 mm zirconium silicate media) at a rate of 1 gallon per minute.

This milled slurry was then centrifuged using a Dorr-Oliver disc-nozzle type centrifuge (9.3 inch disc diameter) at about 9000 rpm's (correlates to about 10,000 G's). The resulting slurry was designated as Base Silica Slurry A. Base Silica Slurry A was measured to have 90% of the particles at or below 0.4 microns.

A second sample of a similar gel was prepared, except that the hydrous silica gel slurry had a 50% by weight total volatiles content. This hydrous gel slurry was then media milled using the same NETZSCH mill while being fed at 0.2–0.25 gallon per minute. This milled slurry was then centrifuged under more severe conditions to yield a finer particle size colloid designated as Base Silica Slurry B. Specifically, this slurry was centrifuged a second time at 90 minutes at around 1,500 G's. The particle size distribution of Silica Slurry B was measured to have 90% particles at or below 0.2 microns.

|  | Silica Slurry A | Silica Slurry B |
|---|---|---|
| Silica Concentration (% solids by weight) | 17% | 16% |
| Particle Size, $\mu$ |  |  |
| 10%< | .14 | .09 |
| 50%< | .23 | .12 |
| 90%< | .40 | .17 |
| $N_2$ BET Surface Area, $m^2/g$ | 219 | 232 |
| $N_2$PV (.967 P/Po), cc/g | .96 | .62 |

Example 2

Autoclaving of Submicron Silica Gel Suspensions

Three 3 gallon samples of the Base Silica Slurry A and one 3 gallon sample of Base Silica Slurry B were diluted to approximately 12.7% solids, pH adjusted to 9.5 (KOH), then sealed in a stainless steel bomb and then aged at the time/temperature conditions given in the table below. Particle size, pH, and $N_2$ porosimetry evaluations of the autoclaved products are also given. The slurries were adjusted to a pH of 6 before drying and conducting the $N_2$ porosimetry measurements. This adjustment minimizes surface area reduction during the drying process necessary to measure the surface area, thereby making the measurements more accurate. The samples were dried for these measurements using conventional techniques, e.g., heating the slurry to 105° C. until dry. Autoclaving results in a significant surface area loss for each of the base silica suspensions, but substantially no change in particle size.

Autoclaving of Submicron Silica Gel
W-500 ID Hydrous Gel Base

| Sample | Autoclave Condition Hrs. | °C. | Size, µ 10%< | 50%< | 90%< | pH | % solids | $N_2PV$ (cc/g) | BET SA $(m^2/g)$ |
|---|---|---|---|---|---|---|---|---|---|
| Base Silica A | — | — | .14 | .23 | .40 |  | 16.6 | .96 | 219 |
| A-1 | 30 | 125 | .13 | .24 | .40 | 10.8 | 12.6 | .55 | 83 |
| A-2 | 25 | 150 | .15 | .26 | .42 | 10.7 | 12.8 | .51 | 59 |
| A-3 | 28 | 170 | .16 | .27 | .45 | 10.8 | 12.7 | .27 | 42 |
| Base Silica B | — | — | .09 | .12 | .17 |  | 16.1 | .62 | 232 |
| B-1 | 16 | 120 | .09 | .12 | .17 | 10.7 | 12.6 | .44 | 110 |

Example 3

Evaluation of Autoclaved Slurries for $SiO_2$ Polish Rate

Prior to polishing rate evaluation, a sample of the Base Silica Slurry A was diluted with DI water to 12.7% solid. This is the data reported for Base Silica A in FIG. 1. Then, this sample as well as each of the autoclaved slurries A-1 through A-3 and B-1, were adjusted to a pH range of 10.7–10.9 with KOH. These samples and a sample of a commercial slurry of fumed silica (ILD 1300 slurry from Rodel) were evaluated for $SiO_2$ removal rate using 4 inch $SiO_2$ coated Si wafers. Polish rate tests were made using a Strasbaugh 6CA polisher with a SUBA 500 pad employing a two minute polish time. The distance between the center of the polishing pad and the center of the wafer was set at five inches. Different polishing conditions (pressure (P), and angular velocity (V) of the polishing pad) were used. These conditions and the results are reported in FIG. 1 showing $SiO_2$ polish (removal) rate for the base silica slurries as a function of polishing severity (pressure times angular velocity of the polishing pad). Pressure is presented as pounds per square inch (psi) and angular velocity is presented as revolutions per minutes (rpm).

The data show a significant increase in polish rate with increase in autoclave severity. The rates range from approximately 50% of the commercial polish slurry rate for the non-autoclaved silica gel product to approximately twice the rate for the commercial polish slurry rate.

Figure 2:
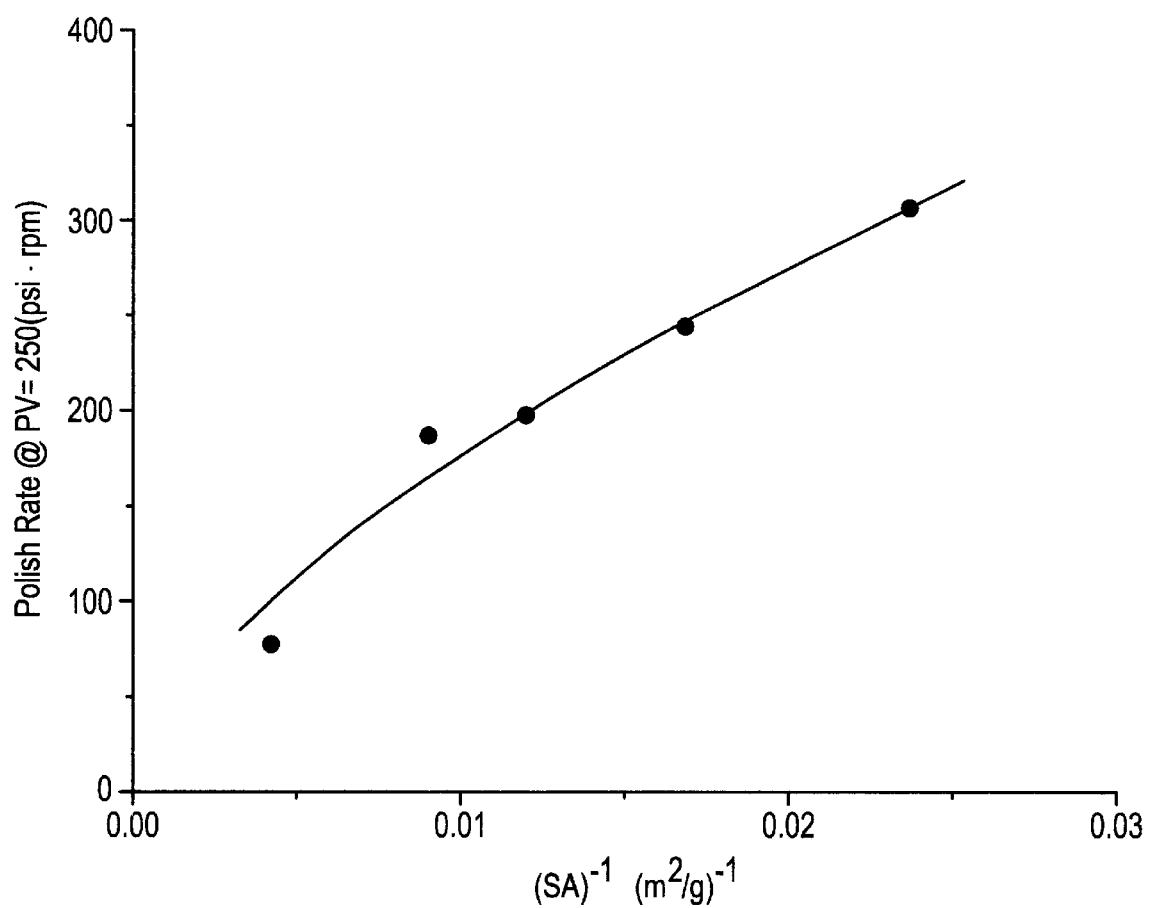
FIG. 2 is a graph indicating that the abrasiveness of a slurry, as reflected in material removal rate, is related to the particle surface area (SA) of the slurry at a constant P·V. The surface area is plotted as an inverse of the actual BET surface area measured.

Furthermore, a strong correlation between observed polish rate and reciprocal surface area of the autoclaved silica gel slurries is shown in FIG. 2. This data indicates that the abrasiveness of inorganic oxide particles can be adjusted by altering the surface area of the particles using the autoclave and modifying the conditions to obtain a certain surface area and the abrasive properties associated with that particular surface area.

Example 4

Preparation of Abrasive Slurry from RD Gel

A three gallon 25% by weight solids aqueous suspension of RD silica xerogel (7 µMPS, 0.4 cc/g $N_2$ pore volume, 650 $m^2/g$ BET surface area) was prepared and then adjusted to pH 9.4 using KOH. The slurry was then media milled (Netzsch mill) and centrifuged (Dorr-Oliver) in a manner according to Example 1. The resulting slurry had 15.5% solids and a median particle size of 0.24µ. The slurry was then autoclaved in a manner according to Example 2 at conditions of 150° C. for 24 hours. The resulting slurry was adjusted to 12.0% solids and pH 11.5 using KOH. Properties of the slurry are summarized below.

|  | RD Silica Gel Slurry |
|---|---|
| Silica Concentration (% solids by weight) | 12.0 |
| Particle Size, µ |  |
| 10%< | .14 |
| 50%< | .24 |
| 90%< | .39 |
| pH | 11.5 |
| $N_2PV$ (cc/g) | .22 |
| BET SA $(m^2/g)$ | 41 |

Example 5

Evaluation of Autoclaved RD Gel Slurry for $SiO_2$ Removal Rate

The slurry of Example 4 was evaluated for $SiO_2$ removal rate using 6 inch diameter $SiO_2$ coated Si wafers. Polish rate tests were made using a Strasbaugh 6CA polisher with a SUBA 500 pad employing a two minute polishing time. Different polishing conditions (pressure, P; pad rotation speed, V) were used. In all cases a five inch separation distance between the pad center and wafer center was maintained during polishing. Results of this polishing rate study are summarized below.

| P (psi) | V (rpm) | P · V (psi · rpm) | Polish Rate (nm/min) |
|---|---|---|---|
| 5 | 30 | 150 | 130 |
| 5 | 40 | 200 | 187 |
| 7 | 50 | 350 | 360 |

What is claimed is:

1. A method for imparting a desired abrasivity to a slurry of particles, comprising (a) preparing a slurry of porous inorganic oxide particles having measurable BET surface area, (b) thermally treating the slurry to obtain a particle BET surface area previously identified to have the desired abrasivity as measured by a polishing rate, and (c) adjusting the slurry to be suitable for use as an abrasive slurry.

2. The method of claim 1 wherein the inorganic oxide is silica which is heated in step (b) to a temperature of at least 100° C.

3. The method of claim 2 wherein the particles in (b) are thermally treated in an autoclave.

4. The method of claim 3 wherein the porous inorganic oxide comprises silica gel.

5. The method of claim 4 wherein the particles are heated to obtain a BET surface area in the range of 40 to 120 m$^2$/g.

6. The method of claim 5 wherein the slurry in (c) at 12.6% by weight solids, and a pH of about 10.8 has a polishing rate for silica in the range of 150 to 250 psi·rpm.

7. The method of claim 6 wherein the slurry is adjusted to be suitable for chemical/mechanical polishing.

8. The method of claim 4 wherein the particles are heated to obtain a BET surface area of 60 m$^2$/g or less.

9. The method of claim 1 wherein the porous inorganic oxide particles in (a) comprises a member selected from the group consisting of silica gel, fumed silica, precipitated silica and alumina.

* * * * *